United States Patent [19]
Hashimoto

[11] Patent Number: 5,218,453
[45] Date of Patent: Jun. 8, 1993

[54] OPTICAL DISC ACCESS CONTROL APPARATUS

[75] Inventor: Minoru Hashimoto, Kanagawa, Japan

[73] Assignee: Sony Corporation, Tokyo, Japan

[21] Appl. No.: 791,070

[22] Filed: Nov. 12, 1991

[30] Foreign Application Priority Data

Nov. 16, 1990 [JP] Japan .................. 2-308517

[51] Int. Cl.$^5$ ............... H04N 5/76; G11B 17/22; G11B 7/00
[52] U.S. Cl. .................. 358/342; 358/907; 369/44.28; 369/32
[58] Field of Search ........... 358/342, 335, 907; 369/32, 44.28; 360/78.01, 78.04, 78.05, 78.06, 78.07, 78.08, 78.09, 78.11, 78.12, 78.13, 78.14

[56] References Cited

U.S. PATENT DOCUMENTS

| | | | |
|---|---|---|---|
| 3,876,842 | 9/1975 | Merer et al. | 250/202 |
| 3,909,608 | 4/1975 | Bouwhuis | 179/100.3 V |
| 4,774,699 | 9/1988 | Giddings | 358/342 |
| 4,887,253 | 12/1989 | Tateishi | 358/342 |
| 5,111,305 | 5/1992 | Yamashita | 358/342 |
| 5,134,500 | 7/1992 | Tobe | 358/342 |
| 5,148,417 | 9/1992 | Wong et al. | 369/32 |

Primary Examiner—Tommy P. Chin
Assistant Examiner—Thai Tran
Attorney, Agent, or Firm—Philip M. Shaw, Jr.

[57] ABSTRACT

A video disc apparatus including a disc rotating device for rotating an optical video disc at a constant linear velocity, a tracking servo device for causing an optical pickup to tack a recording track on the optical video disc, and a translating device for translating the optical pickup along the radius of the optical pickup. It is detected by a detection device if the rotational frequency of the optical video disc by the disc rotating device is within a frequency range in the vicinity of the resonance frequency of the optical pickup. Depending on a detection output of the detection device the operation of an access controlling device is switched so that, in the frequency range in the vicinity of the resonance frequency of the optical pickup, a track jump control is performed for shifting the optical pickup towards the target track position on on the optical video disc with the tracking servo device in the energized state.

5 Claims, 3 Drawing Sheets

OPTICAL DISC ACCESS CONTROL APPARATUS

BACKGROUND OF THE INVENTION

1. Field of the Invention

This invention relates to an optical disc recording and/or reproducing apparatus comprising rotational driving means for an optical disc for rotating an optical disc at a constant linear velocity, tracking servo means for controlling the tracking of the optical disc on the recording track on the optical disc, and translating means for translating said optical pickup along the radius of the optical disc.

2. Description of the Related Art

In general, in an optical disc recording and/or reproducing apparatus, employing an optical disc as a recording medium, the recording track of the optical disc is scanned by a laser beam, as the disc is rotated at a constant linear velocity or at a constant angular velocity by disc rotating means, so that information signals are recorded or reproduced along the recording track. The optical head is moved along the radius of the disc by feed means for scanning the totality of the recording tracks on the disc. The optical pickup is controlled by focusing servo or tracking servo to permit the recording tracks on the optical disc to be scanned accurately by the laser beam.

The tracking servo controlling means for applying tracking servo to the optical head operates for producing a tracking error signal proportionate to the deflection in the track pitch direction of the recording tracks from the detection output of the optical pickup and feeding the tracking error signal feed back to the tracking actuator to perform a tracking control for coinciding the center of the spot of the laser beam with the center of the track. Among the methods known for detecting the tracking error in the optical disc recording and/or reproducing apparatus, there are a so-called three-beam method, as disclosed for example in U.S. Pat. No. 3,876,842 and a so-called pushpull method, as disclosed for example in U.S. Pat. No. 3,909,608.

With the optical disc apparatus for recording and/or reproducing the information signals by scanning the recording tracks with a laser beam, an optical head access control of translating the optical head to a desired track position is performed by a track jump control method, according to which, with the tracking control means remaining in operation, the optical pickup is shifted at a time by plural tracks, such as by 100 tracks, towards the desired target position. On the other hand, with an optical disc recording and/or reproducing apparatus in need of high speed accessing, the optical head is translated by translating means at an elevated velocity to close to the desired track position, with the tracking control means remaining standstill, after which the tracking servo control means is operated for accessing the target track position by track jump control.

With a so-called compact disc for audio or an optical video disc, the optical disc is rotated at a constant linear velocity along a recording track according to a constant linear velocity (CLV) system for rendering the recording density constant for the overall disc surface.

Meanwhile, certain optical disc recording and/or reproducing apparatus, such as an optical video disc, has a larger mass, and yet is in need of a high velocity rotation, such as 1,800 rpm. The mechanical system supporting the optical pickup of such apparatus is subject to considerable vibrations at a period corresponding to the period of rotation of the disc.

Among the transmission characteristics of tracking of the optical pickup is a resonance frequency of, as shown for example in FIG. 1.

In the optical disc recording and/or reproducing apparatus, employing the CLV system optical disc as a recording medium, it occurs frequently that the resonance frequency $f_0$ of the optical pickup be included in the range of fluctuations of the rotational frequency of the optical disc rotated at a constant linear velocity by disc rotating means. With an optical recording and/or reproducing apparatus in which the resonance frequency $f_0$ of the optical pickup is included in the range of fluctuations of the rotational frequency of the optical disc, if, with the tracking control means remaining standstill, the optical pickup is first translated at an elevated velocity to close to the target track position by optical pickup feed means, and tracking controlling means is subsequently operated for having access to the target track position by track jump control, the optical pickup unit may be vibrated with rotation of the optical disc in resonance with vibrations of a mechanical deck on which disc rotating means, optical pickup and translating means etc. are mounted, so that, if the tracking control means is actuated in such state of resonance, the tracking control means is driven into vibrations to render it impossible to operate the tracking servo control means in a regular manner. Object and Summary of the Invention It is therefore an object of the present invention to provide an optical disc access control apparatus comprising disc rotating means for an optical disc for rotating an optical disc at a constant linear velocity, tracking servo means for controlling the optical disc in tracking the recording track on the optical disc and translating means for translating said optical pickup along the radius direction of the optical disc, wherein an accessing control may be performed so that the optical pickup may be moved stably and quickly to a target track position.

In accordance with the present invention, there is provided an optical disc recording and/or reproducing apparatus comprising disc rotating means for rotating an optical disc at a constant linear velocity, tracking servo control means for causing an optical pickup to track a recording track on said optical disc, translating means for translating the optical pickup along the radius of the optical disc, detection means for detecting if the rotational frequency of the optical disc is included within a frequency range in the vicinity of a resonance frequency of the optical pickup, and accessing control means for switching between a track jump control of translating the optical pickup to a target track position on the optical disc with the tracking controlling means in the energized state and a high speed accessing control of shifting the optical pickup by the translating means to the target track position on the optical disc with the tracking control servo means in the deenergized state for effecting accessing control of the optical pickup, wherein the operation of said accessing control means is switched depending on a detection output by said detection means so that the track jump control is effected when the rotational frequency of the optical disc is included in the frequency range in the vicinity of the resonance frequency of the optical pickup and high speed accessing control is effected by the translating means when the rotational frequency is outside of the frequency range in the vicinity of the resonance frequency of the optical pickup.

With the present optical disc recording and/or reproducing apparatus, it is detected by detection means whether or not the rotational frequency of the optical disc by the disc rotating means is included within the frequency range in the vicinity of the resonance frequency of the optical pickup and the operation of the accessing controlling means is switched depending on a detection output of the detection means, in such a manner that, if the rotational frequency of the optical disc is in the vicinity of the resonance frequency of the optical pickup, a track jump control is performed for translating the optical pickup to the desired track position on the optical disc, with the tracking control means remaining in operation, and that, if the rotational frequency of the optical disc is outside the range of frequency in the vicinity of the resonance frequency of the optical pickup, high-speed accessing control is performed by the translating means.

DETAILED DESCRIPTION OF THE PREFERRED EMBODIMENT

Figure 1:
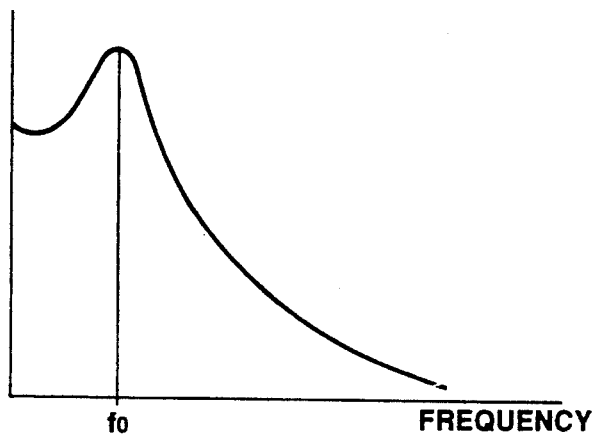
FIG. 1 is a graph showing transmission characteristics of tracking of the optical head.

A preferred embodiment of an optical disc recording and/or reproducing apparatus according to the present invention is explained by referring to the drawings.

Figure 2:
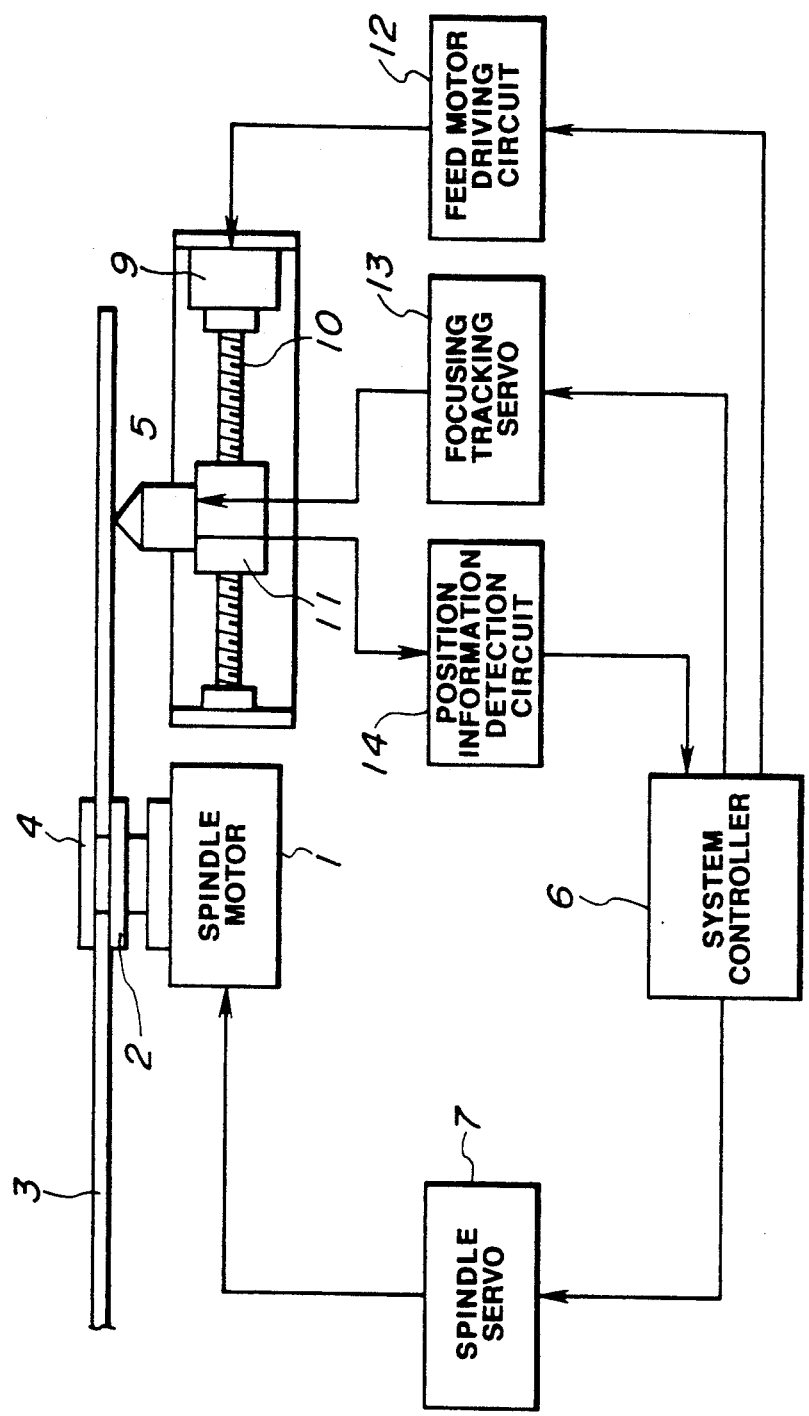
FIG. 2 is a block diagram showing an arrangement of an optical disc apparatus according to the present invention.

The optical disc recording and/or reproducing apparatus of the present invention is constructed as shown for example in FIG. 2.

With the apparatus shown in FIG. 2, the present invention is applied to an optical video disc player in which an optical video disc 3 is detachably mounted by chucking magnet 4 onto a disc table 2 which is rotationally driven by a spindle motor 1 at a constant linear velocity for detecting and reproducing signals recorded on the optical video disc 3 by an optical pickup 5. Meanwhile, the optical video disc 3 is a 30 cm video disc operating under the CLV system.

The spindle motor 1 is rotationally rotated at an rpm of 600 to 1,800, that is at a rotational frequency of 10 Hz to 1,800 Hz, by a spindle servo circuit 7, controlled by a system controller 6, depending on the position of a track on the optical video disc 3 scanned by the optical pickup 5 so that the linear velocity of the optical video disc 3 will be constant.

The optical pickup 6 is mounted on a feed block 11 threadedly engaged with a lead screw 10 rotated by a translating motor 9, and is adapted to be moved along the radius direction of the optical video disc 3 by the movement of the pickup block 11 brought about by the rotation of the lead screw 10. Meanwhile, the driving control of the translating motor 9 that is translation control of the optical pickup 6, is achieved by controlling a motor driving circuit 12 driving the translating motor 9 by the system controller 8. The optical pickup 5 has its objective lens moved in the focusing controlling direction and in the tracking controlling direction by a so-called biaxial actuator so that focusing servo and tracking control will be applied by a focusing and tracking servo circuit 13 operationally controlled by the system controller 6. It is noted that the optical pickup 5 has tracking transmission characteristics such that a resonance frequency $f_0$ exists at 30 Hz. The optical pickup 5 is adapted for irradiating the optical video disc 3 with a laser light for detecting the light reflected from the optical video disc. The detection output from the optical pickup 5 is supplied to a signal processing system, not shown, and to a position information detection circuit 14.

The position information detection circuit 14 detects a position information indicating the track position on the optical video disc 3 scanned by the optical pickup 5 on the basis of the timing information superimposed in the blanking period of video signals recorded on the optical video disc 3. The position information obtained by the position information detection circuit 14 is supplied to the system controller 6.

The system controller controls the operation of the spindle servo circuit 7, depending on the position of a track on the optical video disc 3 scanned by the optical pickup 5 on the basis of the position information produced by the position information detection circuit 14, so that the linear velocity of the optical video disc 3 rotated by the spindle motor 1 will be constant.

Figure 3:
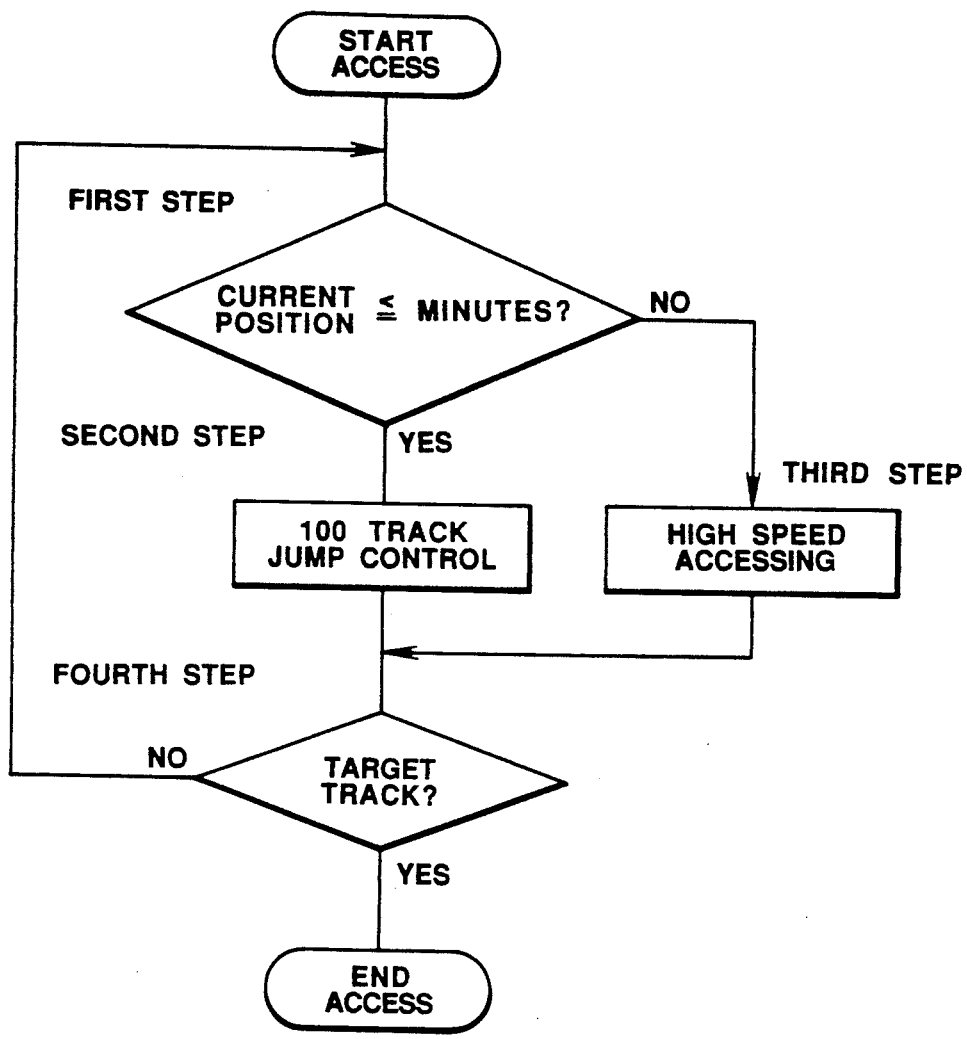
FIG. 3 is a flow chart for explaining the optical pickup accessing controlling operation by a system controller of the optical disc apparatus shown in FIG. 2.

On the other hand, when the optical pickup 5 is shifted from the current position towards the target position on the optical video disc 3 mounted on the disc table 2, the system controller performs access control as shown in a flow chart shown in FIG. 3.

Referring to FIG. 3, when an accessing mode is set by setting means, not shown, the system controller proceeds to determining at a first step if the our rent position on the optical video disc 3 of the optical pickup scanning the recording track on the optical video disc 3 is located in a predetermined area, that is, if the rotational frequency of the optical video disc 3 by the spindle motor 1 is located within a frequency range $\Delta f$ in the vicinity of the resonance frequency $f_0$ of the optical pickup 6, on the basis of the position information produced by the position information detection circuit 14.

It is noted that, with the 30 cm optical video disc operating under the CLV system, the rotational frequency of the disc reaches 26 Hz at a track position after lapse of about six minutes from the innermost track position in the information recording area. For this reason, with the present embodiment, the time information superimposed in the blanking period of the video signals recorded on the optical video disc is read at the above mentioned first step by the position information detection circuit 14 to determine if the current position of the optical pickup 6 is located within the frequency range $\Delta f$ of from 30 to 25 Hz in the vicinity of the resonance frequency $f_0$ of 30 Hz of the optical pickup 6.

If the result of check of the first step is affirmative, that is if the rotational frequency of the optical video disc 3 is located within the frequency range $\Delta f$ in the vicinity of the resonance frequency of the optical pickup 5, control proceeds to the second step. Conversely, if the result of check at the first step is negative, that is if the rotational frequency of the optical video disc 3 is outside the frequency range $\Delta f$ in the vicinity of the resonance frequency $f_0$ of the optical pickup 5 control proceeds to the third step.

It the second step, the system controller 6 effects a track jump control of shifting the optical pickup 5 towards the target track by 100 tracks at a time as one unit, with the focusing tracking servo circuit 13 remaining in the operating state.

Also, at the third step, the system controller 6 effects an accessing control of controlling the feed motor driving circuit 12, with the operation of the tracking servo circuit 13 in a deenergized state, for shifting the optical pickup 5 towards the target track on the optical video disc 3 by the feed motor 9.

At the next fourth step, the system controller 6 proceeds to determining, on the basis of the position information obtained by the position information detection circuit 14, if the current position on the optical video disc 3 of the optical pickup 5 is the target track position on the optical video disc 3. If the result of check is negative, that is if the target track position is not yet reached, the system controller 6 reverts to the first step to repeat the accessing controlling operation of the optical head 6. Conversely, if the result of check at the fourth step is affirmative, that is if the optical pickup 5 has reached the target track position on the optical video disc 3, the accessing controlling operation is terminated.

Figure 4:
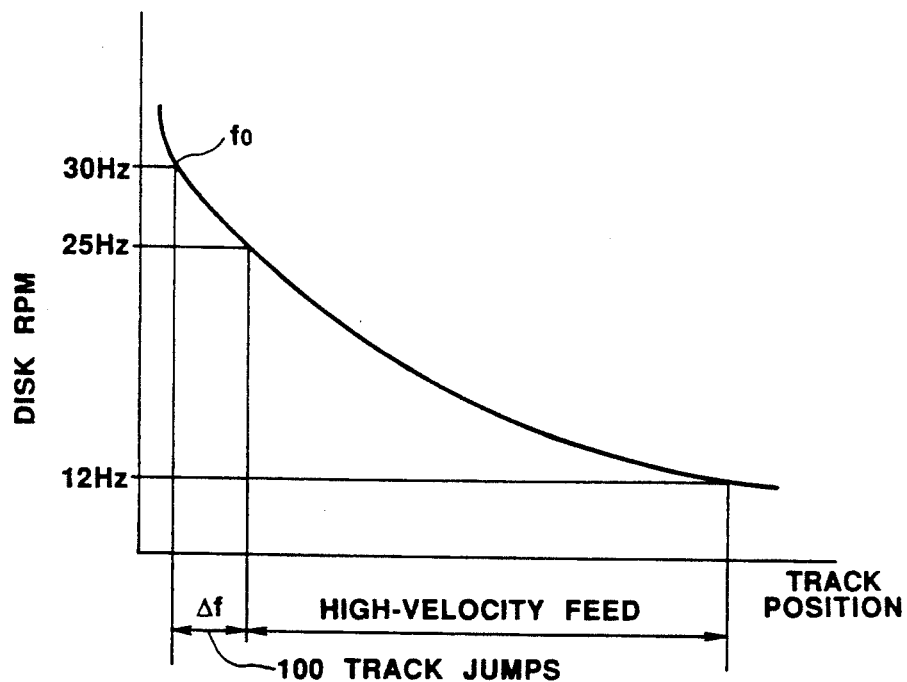
FIG. 4 is a graph for explaining the optical head accessing controlling operation by the system controller shown in FIG. 4.

In this manner, with the present optical disc recording and/or reproducing apparatus, since the optical pickup 5 is shifted by track jump control towards the target track on the optical video disc, with the focusing and tracking servo circuit 13 remaining in the operating state, if the rotational frequency of the optical video disc is within the frequency range $\Delta f$ in the vicinity of the resonance frequency $f_0$ of the optical pickup 5, as shown in FIG. 4, the optical pickup 5 is not in resonant vibrations with the rotation of the optical disc 3 caused by the spindle motor 1, for assuring stable accessing. On the contrary, if the rotational frequency of the optical video disc is outside the frequency range $\Delta f$ in the vicinity of the resonance frequency $f_0$ of the optical pickup 5, the optical pickup 5 is shifted at an elevated velocity towards the target track by the feed motor 9 with the focusing and tracking servo circuit 13 in the deenergized state.

It will be seen from above that the present invention provides an optical disc recording and/or reproducing apparatus in which it is detected by detection means if the rotational frequency of the optical disc caused by the disc driving means is within a frequency range in the vicinity of the resonance frequency of the optical pickup, and the operation of the accessing controlling means is switched depending on a detection output of the detection means, so that, if the rotational frequency is within the frequency range in the vicinity of the resonance frequency of the optical pickup, a track jump control operation of shifting the optical pickup towards a target track position on the optical disc is performed, with the tracking servo means in the energized state without the optical pickup being in resonant vibrations with rotation of the optical disc cause by the disc driving means and, if the rotational frequency is outside the above mentioned frequency range, a high speed accessing controlling of shifting the optical pickup by feed means towards the target track position on the target track position on the optical disc is performed, with the tracking servo means in the deenergized state, with the consequence that the optical pickup may be shifted promptly to the target track position on the optical disc.

The present invention thus provides an optical disc recording and/or reproducing apparatus whereby the optical pickup may be shifted to the target track position promptly and stably by way of an accessing control operation.

What is claimed is:

1. An accessing control apparatus for an optical disc comprising:
   disc rotating means for rotationally driving the optical disc at a constant linear velocity;
   tracking controlling means for causing a light beam emanating from an optical pickup to follow a recording track on the optical disc;
   translating means for translating said optical pickup along a radius of the optical disc;
   detection means for detecting if a number of revolutions of the optical disc by said disc rotating means is within a frequency range in a vicinity of a resonant frequency of said optical pickup;
   access controlling means for effecting accessing control of said optical pickup by switching between a track jump control of translating said optical pickup from a current position on the optical disc to a target track on the optical disc with said tracking controlling means in an energized state and a high speed accessing control of shifting said optical pickup by said translating means from the current position on the optical disc to the target track position on the optical disc with said tracking controlling means in a and deenergized state, respectively
   controlling means for switching an operation of said access controlling means depending on a detecting output by said detection means for effecting said track jump control for the number of revolutions of the optical disc within the frequency range in the vicinity of the resonance frequency of said optical pickup or effecting high speed accessing control by said translating means for said number of revolutions of the optical disc outside said frequency range in the vicinity of said resonance frequency.

2. The accessing control apparatus according to claim 1, wherein said detection means includes position detection means for detecting a position of said optical pickup with respect to said optical disc and wherein said controlling means controls the accessing operation of said accessing control means based on a detection output from said position detection means.

3. An optical video disc reproducing apparatus comprising:
   disc rotating means for rotating the optical video disc about 30 cm in diameter at a constant linear velocity;
   an optical pickup having a resonance frequency of approximately 30 Hz;
   tracking controlling means for causing a light beam emanating from the optical pickup to follow a recording track on the optical video disc;
   translating means for translating said optical pickup along a radius of the optical video disc;
   detection means for detecting if a number of revolutions of the optical video disc by said disc rotating means is within a frequency range in a vicinity of the resonance frequency of said optical pickup;
   access controlling means for effecting accessing control of said optical pickup by switching between a track jump control of shifting said optical pickup from a current position on the optical video disc towards a target track on said optical video disc with said tracking controlling means in an energized state and a high speed accessing control of shifting said optical pickup by said translating means from the current position on the optical disc towards the target track position on the optical video disc with said tracking controlling means in a deenergized state; and controlling means for switching an operation of said access controlling means depending on a detection output by said detection means for effecting said track jump control for the number of revolutions of the optical video disc within the frequency range in the vicinity of the resonance frequency of said optical pickup or effecting high speed accessing control by said translating means for the number of revolutions of said optical video disc outside said frequency range in the vicinity of said resonance frequency.

4. The optical video disc reproducing apparatus according to claim 3, wherein the optical video disc reproducing apparatus is adapted for detecting, by said detection means, if the number of revolutions of said optical disc by said disc rotating means is within the range of 25 to 30 Hz.

5. The optical video disc reproducing apparatus according to claim 3, wherein said detection means includes position detection means for detecting a position of said optical pickup on said optical video disc, said detection means detecting, on the basis of a detection output from said position detecting means, if said optical pickup is within about six minutes from an innermost periphery of a recording area of said optical video disc.

* * * * *